Feb. 26, 1935.   R. BARTHOLOMÄUS   1,992,346
TOOL FOR DRILLING POLYGONAL HOLES
Filed Dec. 29, 1932
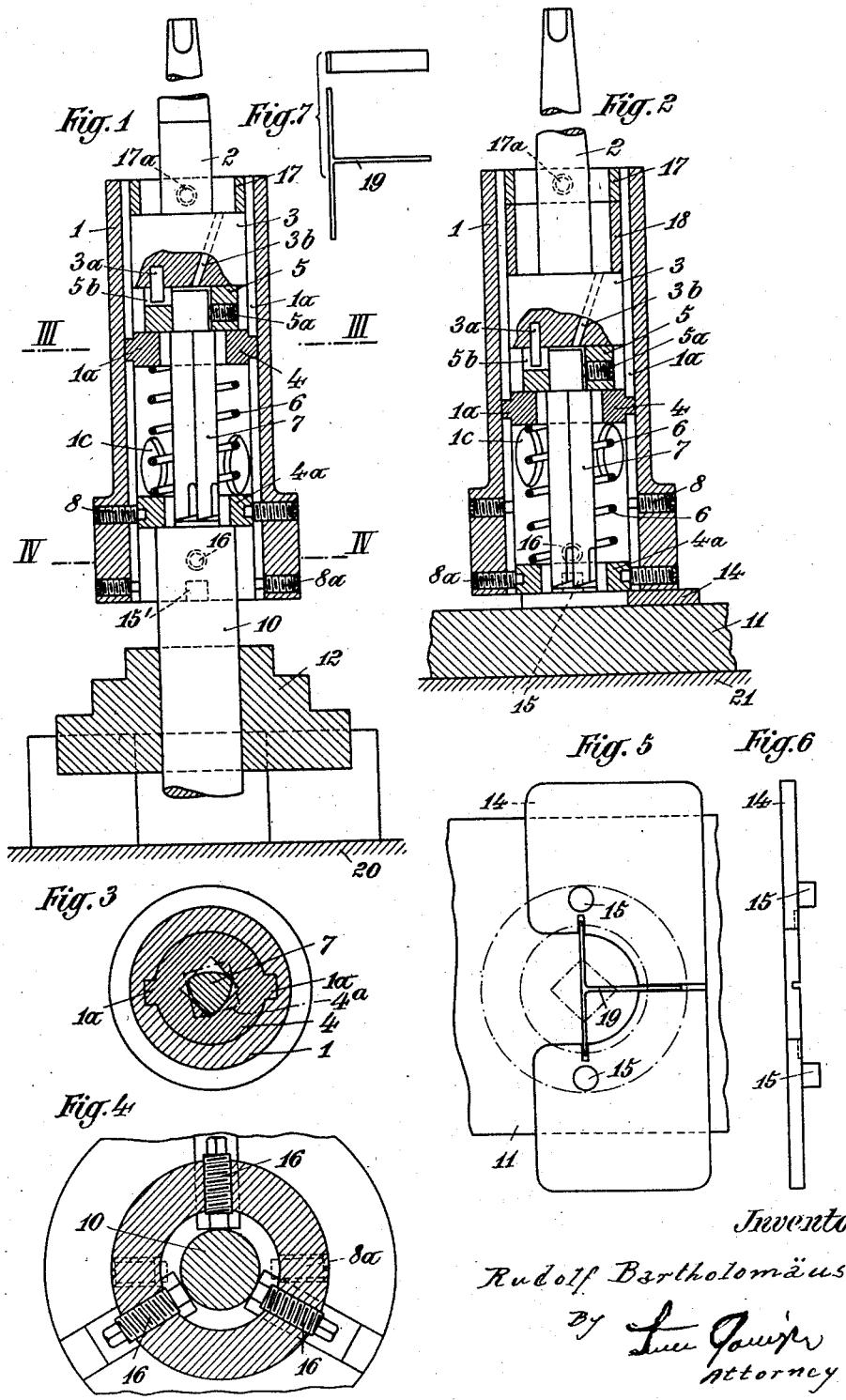
Inventor:
Rudolf Bartholomäus
By [signature]
Attorney Patented Feb. 26, 1935

1,992,346

UNITED STATES PATENT OFFICE 1,992,346

TOOL FOR DRILLING POLYGONAL HOLES

Rudolf Bartholomäus, Berlin, Germany

Application December 29, 1932, Serial No. 649,377
In Germany October 15, 1930

3 Claims. (Cl. 77—61)

My invention relates to tools for drilling polygonal holes in which two camming members are arranged co-axially in a casing in spaced-apart relation for guiding the drill.

It is an object of my invention to improve a tool of the type referred to so that it will drill parallel and not distorted holes.

To this end, I arrange the camming members with corresponding camming faces in the individual members angularly displaced relatively to each other to such an extent as will compensate for the twist of the drill due to drilling resistance.

Distortion of the drill under the reaction of the cutting pressure at its edges is inevitable and would lead to the formation of a correspondingly distorted hole if the distortion were not counteracted by my angular displacement of the camming members.

It is another object of my invention to so design a tool of the type referred to that seizing of the edges of the drill is eliminated. Seizing is due to the varying width of the chips which are removed in the drilling of polygonal holes, and frequently causes breaking of the edges.

With the object of avoiding seizing, I make one of the camming members fixed, and the other movable in the casing, and insert a spring between the two members. Tension is put on the spring as the drill, or the work, as the case may be, is fed. When the feeding pressure is removed, the spring immediately lifts the end of the drill off the bottom of the hole so that the edges will not seize and break.

It is still another object of my invention to provide means for facilitating the location of the drill with respect to the hole.

To this end, I provide a locating plate between the work piece and the drill casing.

In the accompanying drawing, two constructional forms of tools for drilling square holes, which embody my invention, are illustrated by way of example.

In the drawing

Fig. 1 is an axial section of a tool for drilling a square hole in a rotating rod, Fig. 2 is an axial section of a tool for drilling a square hole in a fixed plate, Figs. 3 and 4 are sections on the lines III—III and IV—IV, respectively, in Fig. 1, Fig. 5 is a plan view of the locating appliance referred to, Fig. 6 is an end elevation of its slotted plate, viewed from the left in Fig. 5, and Fig. 7 shows a locating device used with the machine.

Referring now to the drawing, and first to Figs. 1, 3 and 4, 1 is the casing of the tool, here shown as a hollow cylinder with a thickened flange at its outer end. 2 is a spindle to which the inner end of casing 1 is secured. The spindle 2 may be inserted in the headstock of a lathe (not shown) or supported by any other suitable means. It does not rotate but is fed axially.

4 is a movable, and 4a is a fixed camming member in the casing 1. The camming members 4 and 4a are annuli, as shown for the member 4 in Fig. 3, with holes therein for guiding the drill 7. By way of example, camming members for a square hole have been illustrated but it is understood that I am not limited to any particular shape of the hole. The movable member 4, as best seen in Fig. 3, has two lateral lugs 1a in diametrically opposite positions, which engage in parallel grooves of the casing 1. In this manner the movable camming member is free to move axially in the casing but held against rotation therein. The other camming member 4a is fixed in the portion of the casing which is thickened by the flange. 8, 8a are two pairs of chucking screws for holding the fixed camming member 4a in the casing 1. The lugs 1a of the movable member 4 or the holes or depressions for receiving the inner ends of screws 8, 8a in the fixed member 4a, are singularly displaced through a small angle with respect to the holes in the camming members, as shown to an exaggerated extent in Fig. 3, the angle corresponding to the amount of distortion the drill 7 undergoes under the reaction of the cutting pressure. Consequently corresponding guide faces of the two camming members, which are located similarly with respect to said lugs and holes, are similarly out of angular phase with each other. In this manner, the distortion of the drill is compensated and the walls of the holes become plane.

In addition to the screws 8, 8a for chucking the fixed member 4a, screws 16, Fig. 4, are provided for chucking a bar or rod 10 in the casing in whose inner end the square hole is drilled. The bar or rod 10 is held on the face plate 20 of a lathe by chuck jaws 12. It will be understood that while the casing 1 rotates with the bar or rod 10, the spindle 2 is held against rotation, as described.

6 is a coiled spring inserted between the fixed and movable camming members 4a and 4. 5 is a block which is mounted to slide on the movable member 4, and 5a is a set screw for holding the upper end of the drill 7 in the slide block 5. 5b is a slot in the block 5 in which engages a pin 3a. This pin is secured to the lower end of a piston 3 which is mounted to rotate in the casing 1 and is connected to the spindle 2. In the present instance, as the casing 1 rotates, and the spindle with the piston 3 is fixed, the casing rotates on the piston. 17 is a ring which is held at the upper end of the casing 1 by set screws 17a for holding the piston 3 against axial displacement in the casing 1.

For the supply and/or circulation of a lubricant or coolant, a bore 3b is formed in the piston 3, and the casing 1 has comparatively large openings 1c.

In operation, rotation is imparted to the casing 1 from the face plate 20 through the bar or rod 10. The casing rotates on the piston 3 as its journal. The block 5 and the drill 7 are held against rotation by their connection to the fixed piston 3. The drill only performs reciprocating movement transversely to its axis in the holes of the camming members 4 and 4a. The spindle 2 and the piston 3 are fed and the spring 6 is compressed by the feeding movement. The section of the drill 7 and the configuration of the faces in the holes of the camming members 4, 4a are so determined that they impart to the drill the movement required for drilling a square hole as the camming members rotate with the casing 1. Lubricant and/or coolant circulate through the passages 3b and the openings 1c which latter may also serve for removing the chips.

The spring 6 which is compressed as the drill 7 is fed, applies the fixed camming member 4a to the end of the bar or rod 10 so that the drill 7 is reliably guided from the beginning of the operation. As the drill penetrates into the hole, the movable camming member 4 moves gradually nearer to the fixed member and compresses the spring 6 which thus counteracts the feeding movement and raises the drill from the base of the hole as soon as the spindle 2 is retracted, preventing seizing and damage to its edges.

Instead of a coiled spring as shown a helical spring (not shown) might be provided which when compressed is laid down flat like a spiral. This permits reduction of the length of the portion of the drill which projects from the fixed camming member 4a without reducing the depth of the hole which can be drilled.

My novel tool may be adapted to any machine for rotary movement of the work, such as a lathe, Fig. 1, a turret lathe, or the like, but it may also be adapted to a machine in which the tool rotates, such as a drill press. In any case, if the work rotates as in Fig. 1, the casing 1 and the camming members 4, 4a rotate while if the work does not rotate the casing and the camming members are fixed.

Fig. 2 shows my novel tool as applied to a drill press. 21 is the table of the press, and 11 is the work on the table. Here, the casing 1 is fixed and may be connected to the work 11 by a plate 14 which holds the casing against rotation. The spindle 2 and the piston 3 rotate. Their rotation is transmitted to the drill 7 which rotates and reciprocates transversely to its axis under the guidance of the camming members 4, 4a. While in Fig. 1 the fixed camming member 4a is held by the screws 8 which are remote from the lower end of casing 1, it is held by the screws 8a at the lower end in Fig. 2. The piston 3 is now nearer to the lower end of the casing 1 and this is made up for by inserting a distance sleeve 18 between the piston 3 and the annular holder 17.

The means for connecting the casing to the work and for locating the drill and the hole, will now be described with reference to Figs. 5, 6 and 7. 15 are pins or studs on the plate 14 which engage in holes at the lower end of the casing 1 and prevent rotation of the casing. The plate 14 is placed on the work 11 and is then adjusted with respect to the casing until its studs 15 engage in the holes in the casing. The work 11 and the plate 14 are then chucked or clamped on the table 21.

19 is a T for locating the hole. Its arms intersect where two diagonals of the polygonal hole intersect, and the arms must register with the diagonals. In operation, the T is placed on the work 11 in the position shown in Fig. 5, with its arms registering with the two diagonals of the square hole. The arms of the T engage in slots of the plate 14 and the plate must not be secured to the work unless the arms of the T 19 are in proper position with respect to the diagonals.

I claim:

1. A tool for drilling polygonal holes comprising a drill with a shank having a cross-section in the form of a polygon with curved sides, a casing, two axially separated guides in said casing for determining drill movements transverse to the drill axis, one of the guides being axially movable in the casing and the other being stationary therein and both having polygonal guide holes therein, means for securing the movable guide against rotation relatively to the casing, and additional means for securing the stationary guide in the casing and with its drill guiding surfaces displaced through a predetermined angle relatively to the drill guiding surfaces of the movable guide.

2. A tool for drilling polygonal holes comprising a drill with a shank having a cross-section in the form of a polygon with curved sides, a casing, two axially separated guides in said casing for determining drill movements transverse to the drill axis, one of the guides being axially movable in the casing and the other being stationary therein and both having polygonal guide holes therein, means for securing the movable guide against rotation relatively to the casing, additional means for securing the stationary guide in the casing and with its drill guiding surfaces displaced through a predetermined angle relatively to the drill guiding surfaces of the movable guide, and means for automatically retracting the drill from the drilled hole when the feeding pressure is removed.

3. A tool for drilling polygonal holes comprising a drill with a shank having a cross-section in the form of a polygon with curved sides, a casing, two axially separated guides in said casing for determining drill movements transverse to the drill axis, one of the guides being axially movable in the casing and the other being stationary therein and both having guide holes therein, means for securing the movable guide against rotation relatively to the casing, additional means for securing the stationary guide in the casing and with its drill guiding surfaces displaced through a predetermined angle relatively to the drill guiding surfaces of the movable guide, and a spring in said casing between the movable and the stationary guides.

RUDOLF BARTHOLOMÄUS.